United States Patent
Foley et al.

(10) Patent No.: US 8,627,295 B2
(45) Date of Patent: Jan. 7, 2014

(54) METHODS AND APPARATUS FOR TESTING USER INTERFACES

(75) Inventors: Harold Brooks Foley, Cary, IL (US); Christine Peeters, Bartlett, IL (US)

(73) Assignee: General Electric Company, Schenectady, NY (US)

( * ) Notice: Subject to any disclaimer, the term of this patent is extended or adjusted under 35 U.S.C. 154(b) by 735 days.

(21) Appl. No.: 12/576,858

(22) Filed: Oct. 9, 2009

(65) Prior Publication Data

US 2011/0088018 A1  Apr. 14, 2011

(51) Int. Cl.
*G06F 9/44* (2006.01)

(52) U.S. Cl.
USPC ........... 717/131; 717/127; 717/128; 717/129; 717/130; 717/132; 717/133

(58) Field of Classification Search
None
See application file for complete search history.

(56) References Cited

U.S. PATENT DOCUMENTS

| | | | |
|---|---|---|---|
| 5,475,843 A * | 12/1995 | Halviatti et al. | 717/124 |
| 6,421,822 B1 * | 7/2002 | Pavela | 717/125 |
| 6,978,440 B1 * | 12/2005 | Pavela | 717/125 |
| 7,093,238 B2 * | 8/2006 | Givoni et al. | 717/129 |
| 7,272,822 B1 * | 9/2007 | Riggins et al. | 717/124 |
| 7,337,432 B2 * | 2/2008 | Dathathraya et al. | 717/125 |
| 7,421,683 B2 * | 9/2008 | Robertson et al. | 717/130 |
| 7,437,614 B2 * | 10/2008 | Haswell et al. | 714/38.13 |
| 7,856,619 B2 * | 12/2010 | He et al. | 717/109 |
| 7,979,849 B2 * | 7/2011 | Feldstein et al. | 717/128 |
| 2003/0084429 A1 * | 5/2003 | Schaefer | 717/125 |
| 2004/0025083 A1 * | 2/2004 | Nanja et al. | 714/35 |
| 2005/0188357 A1 * | 8/2005 | Derks et al. | 717/124 |
| 2007/0220342 A1 * | 9/2007 | Vieira et al. | 714/33 |

* cited by examiner

*Primary Examiner* — Henry W. H. Tsai
*Assistant Examiner* — Jing-Yih Shyu
(74) *Attorney, Agent, or Firm* — Hanley, Flight & Zimmerman, LLC

(57) ABSTRACT

Methods and apparatus for testing user interfaces are disclosed herein. An example method includes extracting object data from a file associated with a user interface; storing a plurality of object definitions corresponding to the extracted object data in a computer readable storage medium; and generating, at a computer having a tangible memory, a test script for the user interface using the object definitions, wherein the test script is to be generated based on one or more test definitions defining one or more attributes of the object definitions to be tested in the test script, and wherein the test script is to be generated based on one or more automation rules defining how the object definitions are to be tested.

16 Claims, 4 Drawing Sheets

METHODS AND APPARATUS FOR TESTING USER INTERFACES

FIELD OF THE DISCLOSURE

The present disclosure relates generally to healthcare information systems and, more particularly, to methods and apparatus for testing user interfaces.

BACKGROUND

Healthcare environments, such as hospitals and clinics, typically include information systems (e.g., electronic medical record (EMR) systems, lab information systems, outpatient and inpatient systems, hospital information systems (HIS), radiology information systems (RIS), storage systems, picture archiving and communication systems (PACS), etc.) to manage information such as, for example, patient medical histories, imaging data, test results, diagnosis information, management information, financial information, and/or scheduling information. To access the healthcare information, add data to one or more of the information systems, and/or to otherwise interact with the information system(s), workstations associated with the information system(s) utilize one or more user interfaces. The user interface(s) are typically tested before implementation in a healthcare environment and/or any other system utilizing user interface(s).

SUMMARY

An example computer implemented method includes extracting object data from a file associated with a user interface. Further, the example method includes storing a plurality of object definitions corresponding to the extracted object data in a computer readable storage medium. Further, the example method includes generating, at a computer having a tangible memory, a test script for the user interface using the object definitions, wherein the test script is to be generated based on one or more test definitions defining one or more attributes of the object definitions to be tested in the test script, and wherein the test script is to be generated based on one or more automation rules defining how the object definitions are to be tested.

An example tangible machine readable medium has instructions stored thereon that, when executed, cause a machine to extract object data from a file associated with a user interface. Further, the example tangible machine readable medium has instructions stored thereon that, when executed, cause a machine to store a plurality of object definitions corresponding to the extracted object data in a computer readable storage medium. Further, the example tangible machine readable medium has instructions stored thereon that, when executed, cause a machine to generate a test script for the user interface using the object definitions, wherein the test script is to be generated based on one or more test definitions defining one or more attributes of the object definitions to be tested in the test script, and wherein the test script is to be generated based on one or more automation rules defining how the object definitions are to be tested.

An example apparatus includes an object data extractor to object data from a file associated with a user interface. Further, the example apparatus includes a memory to store a plurality of object definitions corresponding to the extracted object data. Further, the example apparatus includes a test script generator to generate a test script for the user interface using the object definitions, wherein the test script is to be generated based on one or more test definitions defining one or more attributes of the object definitions to be tested in the test script, and wherein the test script is to be generated based on one or more automation rules defining how the object definitions are to be tested.

Figure 1:
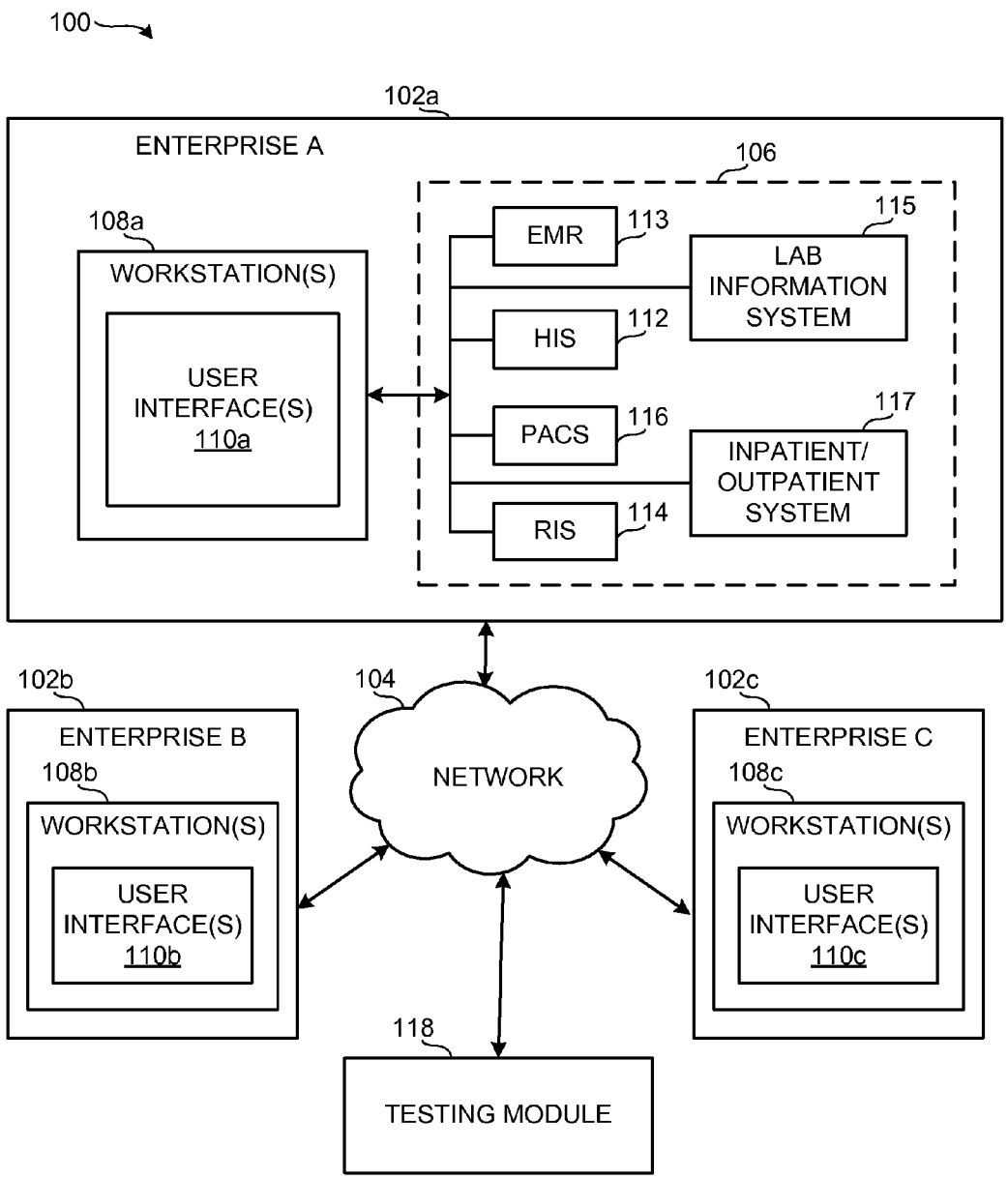
FIG. 1 is a block diagram of an example healthcare information system.

The foregoing summary, as well as the following detailed description of certain implementations of the methods, apparatus, systems, and/or articles of manufacture described herein, will be better understood when read in conjunction with the appended drawings. It should be understood, however, that the methods, apparatus, systems, and/or articles of manufacture described herein are not limited to the arrangements and instrumentality shown in the attached drawings.

DETAILED DESCRIPTION

Although the following discloses example methods, apparatus, systems, and articles of manufacture including, among other components, firmware and/or software executed on hardware, it should be noted that such methods, apparatus, systems, and/or articles of manufacture are merely illustrative and should not be considered as limiting. For example, it is contemplated that any or all of these firmware, hardware, and/or software components could be embodied exclusively in hardware, exclusively in software, exclusively in firmware, or in any combination of hardware, software, and/or firmware. Accordingly, while the following describes example methods, apparatus, systems, and/or articles of manufacture, the examples provided are not the only way(s) to implement such methods, apparatus, systems, and/or articles of manufacture.

Systems designed to interact with a user typically implement a plurality of user interfaces by which exchanges of information or data are achieved. Many systems utilize a graphical user interface (GUI) that is displayed to the user and is capable of conveying and receiving information. A typical GUI includes a plurality of elements or objects (e.g., buttons, check boxes, combo-boxes, lists, text boxes, etc.) with which the user interacts to provide information and/or to instruct one or more devices or programs to perform certain operation(s).

Programmers and user interface designers often use one or more applications to build such a user interface based on, for example, a markup language. Example markup languages include extensible markup language (XML), hypertext markup language (HTML), and extensible application markup language (XAML). User interfaces can be designed or implemented additional or alternative languages, techniques, programs, applications, software, etc.

User interfaces are typically tested for proper functionality before their release, during development, as a debugging procedure, and/or at any other suitable time or stage. However, testing user interfaces presents significant challenges. For example, even a simple user interface is likely to have a large amount of possible sequences through which a user may navigate. A selection of a first option may open any number of other options and/or paths, while a selection of a second option may open another number of additional or alternative options and/or paths. Moreover, the sequence in which the user selects the options alters the subsequent options and/or paths. These conditions cause the size of the testing space to increase exponentially with the increase in user interface elements, objects, paths, and/or options.

This difficultly is exacerbated by the fact that user interfaces are often tested using manually created test scripts. To manually create test scripts, testers explore the user interfaces as they are visually presented (e.g., to a user on a display device) by navigating through the possible options and/or paths. As the testers navigate through a user interface, the testers generate test scripts capable of exercising the different options, elements, and/or paths. The manual creation of the test scripts is tedious, time consuming, and likely to include errors.

Challenges also arise during development stages for testing user interfaces. During development, changes or updates have ripple effects throughout the testing process. That is, a change to one element may affect dependent sequence(s) and/or other options or paths. When testing continuously throughout the development of user interface, manual creation of large portions of the test scripts is repeated, redone, and/or altered each time a change or update is made to the user interface. When relying on testers to perform these tasks using the visual representation of the user interface, the testing process can be time consuming and costly.

In addition, relying on the visual representation of the user interface limits a tester to that particular implementation of the user interface. Often, different versions of a user interface vary in regards to the visually presented elements, options, and/or paths (e.g., when testing a user-customizable user interface). In such instances, the different versions require different test scripts. Using conventional methods, the tedious process of manually creating test scripts must be repeated for the different versions of the user interface by exploring the different versions as they are visually presented.

The example methods, apparatus, systems, and/or articles of manufactures described herein improve testing of user interfaces by, for example, providing an automated validation of user interface content and the functionality thereof. As described in greater detail below, the example methods, apparatus, systems, and/or articles of manufacture described herein use data extracted from a file associated with a user interface to generate one or more object definitions corresponding to objects or elements of the user interface. Generally, the object definitions are used to automatically generate one or more test scripts capable of testing the options and/or paths of the user interface. Aspects of the automated generation may be controlled and/or configured using, for example, a set of rules and/or definitions. The automatically generated test scripts can be stored and used to test a corresponding user interface. Additional aspects and advantages of the example methods, apparatus, systems, and/or articles of manufacture are described in greater detail herein.

While the example methods, apparatus, systems, and/or articles of manufacture are described herein in the context of healthcare information systems, the example methods, apparatus, systems, and/or articles of manufacture described herein can be implemented in connection with any suitable type of method, apparatus, system, and/or article of manufacture associated with and/or implementing one or more user interfaces. That is, the healthcare information systems described herein are for purposes of illustration and not limitation. Different types of user interfaces implemented in connection with different types of systems can be tested using the example methods, apparatus, systems, and/or articles of manufacture described herein.

FIG. 1 is a block diagram of an example medical data system 100 capable of implementing the example methods, apparatus, systems, and/or articles of manufacture described herein for testing user interfaces. The example medical data system 100 of FIG. 1 includes a plurality of healthcare enterprises 102*a-c*. In the illustrated example of FIG. 1, the enterprise labeled with reference numeral 102*a* is illustrated and described herein as a hospital. However, any of the enterprises 102*a-c* may be any type of entity and/or device such as, for example, a clinic, a physician's office, a laboratory, a testing center, a personal computer, a mobile device (e.g., a smartphone, a personal digital assistant, and/or a cellular telephone), etc. Further, while FIG. 1 illustrates the components of the hospital 102*a*, the other enterprises (enterprises 102*b-c*) may include additional, alternative, and/or similar components, although not shown in FIG. 1 for purposes of brevity and not limitation.

The enterprises 102*a-c* are in communication via a network 104 implemented by, for example, the Internet, an intranet, a private network, a wired or wireless Local Area Network, a wired or wireless Wide Area Network, a cellular network, and/or any other suitable network. Further, although not shown in the example of FIG. 1, the example medical data system 100 of FIG. 1 may implement an information integration system (e.g., an Integrating the Healthcare Enterprise (IHE) Cross Enterprise Document Sharing (XDS) integration profile) or may be a part of, for example, a health information exchange (HIE), a regional health information organizations (RHIO) configured to facilitate sharing (e.g., access, distribution, registration, etc.) of medical data among the enterprises 102*a-c*.

The example hospital 102*a* includes a healthcare information system 106. While not shown in FIG. 1 for purposes of clarity and brevity, the other enterprises 102*b-c* may include healthcare information systems similar to that of the hospital 102*a*. In the illustrated example, the healthcare information system 106 includes a hospital information system (HIS) 112, an electronic medical record system (EMR) 113, a radiology information system (RIS) 114, a lab information system 115, a picture archiving and communication system (PACS) 116, and an inpatient/outpatient system 117. In the illustrated example, the hospital information system 112, the electronic medical record system 113, the radiology information system 114, the lab information system 115, the PACS 116, and the inpatient/outpatient system 117 are housed in the hospital 102*a* and locally archived. However, in other implementations, one or more elements of the example healthcare information system 106 may be housed one or more other suitable locations. Furthermore, one or more components of the healthcare information system 106 may be combined and/or implemented together. For example, the radiology information system 114 and/or the PACS 116 may be integrated with the hospital information system 112, the PACS 116 may be integrated with the radiology information system 114, and/or any other of the six example information systems 112, 113, 114, 115, 116, and/or 117 may be integrated together.

The hospital information system 112 stores healthcare information such as clinical reports, patient information, practitioner information, and/or financial data received from, for example, personnel at a hospital, clinic, and/or a physician's office. The EMR system 113 stores information related to patients and/or practitioners, medical histories, current treatment records, etc. The radiology information system 114 stores information such as, for example, radiology reports, x-ray images, messages, warnings, alerts, patient scheduling information, patient demographic data, patient tracking information, and/or physician and patient status monitors. Additionally, the radiology information system 114 enables exam order entry (e.g., ordering an x-ray of a patient) and image and film tracking (e.g., tracking identities of one or more people that have checked out a film).

The lab information system 115 stores clinical information such as lab results, test scheduling information, corresponding practitioner(s), and/or other information related to the operation(s) of one or more labs at the corresponding healthcare facility. The PACS 116 stores medical images (e.g., x-rays, scans, three-dimensional renderings, etc.) as, for example, digital images in a database or registry. Images are stored in the PACS 116 by healthcare practitioners (e.g., imaging technicians, physicians, radiologists) after a medical imaging of a patient and/or are automatically transmitted from medical imaging devices to the PACS 116 for storage. In some examples, the PACS 116 may also include a display device and/or viewing workstation to enable a healthcare practitioner to communicate with the PACS 116. The inpatient/outpatient system 117 stores information related to the admission and discharge of patients such as follow up schedules, patient instructions provided by a practitioner, prescription information, presenting symptoms, contact information, etc.

While example types of information are described above as being stored in certain elements of the healthcare information system 106, different types of healthcare data may be stored in one or more of the hospital information system 112, the EMR system 113, the radiology information system 114, the lab information system 115, the PACS 116, and/or the inpatient/outpatient system 117. Further, the information stored in these elements may overlap and/or share types of data.

The example hospital 102a of FIG. 1 and the other enterprises 102b-c include one or more workstations 108a-c capable of interacting with one or more components of the healthcare information system 106 (and/or other healthcare information systems implemented in, for example, the other enterprises 102b-c). The workstation(s) 108a may be any equipment (e.g., a personal computer, a mobile device such as a smartphone, etc.) capable of executing software that permits electronic data (e.g., medical reports) and/or electronic medical images (e.g., x-rays, ultrasounds, MRI scans, clinical reports, test results, etc.) to be acquired, stored, or transmitted for viewing and operation.

The example workstation(s) 108a-c of FIG. 1 implement one or more user interfaces 110a-c to enable a healthcare practitioner (or any other type of user) to interact with one or more components of the healthcare information system 106 and/or, more generally, the example medical data system 100. Information (e.g., test results, observations, diagnosis, discharges, admissions, findings, reports, etc.) is entered into and/or retrieved from the components of the example healthcare information system 106 via the user interfaces 110a-c by healthcare practitioners (e.g., radiologists, physicians, technicians, administrators, etc.) and/or patients, before, after, and/or during a patient examination and/or any other procedure, such as diagnosing a patient using the information of the healthcare information system 106. Additionally or alternatively, one or more of the user interfaces 110a-c enable a healthcare practitioner to configure and/or use one or more healthcare devices of the example hospital 102a. For example, one of the user interfaces 110a of FIG. 1 is dedicated to operating a medical imaging device (e.g., a magnetic resonance imaging (MRI) device, an X-ray machine, a scanner, etc.). These examples are described herein for purposes of illustration, as any other suitable type of user interface may be included in the example of FIG. 1.

To test the user interface(s) 110a-c as described herein, the example medical data system 100 includes a testing module 118. The example testing module 118 of FIG. 1 is coupled to the network 104 and in communication with the example enterprises 102a-c. The example testing module 118 can be implemented in additional or alternative elements and/or locations in the example medical data system 100 of FIG. 1 and/or any other type of medical data system. For example, the testing module 118 may be implemented in one or more of the workstation(s) 108, and/or one or more components of the healthcare information system 106 (e.g., the hospital information system 112, the electronic medical record system 113, the radiology information system 114, the lab information system 115, the PACS 116, and/or the inpatient/outpatient system 117). As described in greater detail below in connection with FIG. 2, the example testing module 118 of FIG. 1 improves the validation of user interface elements and operation. The example testing module 118 provides additional or alternative features, benefits, and/or improvements as described herein.

Figure 2:
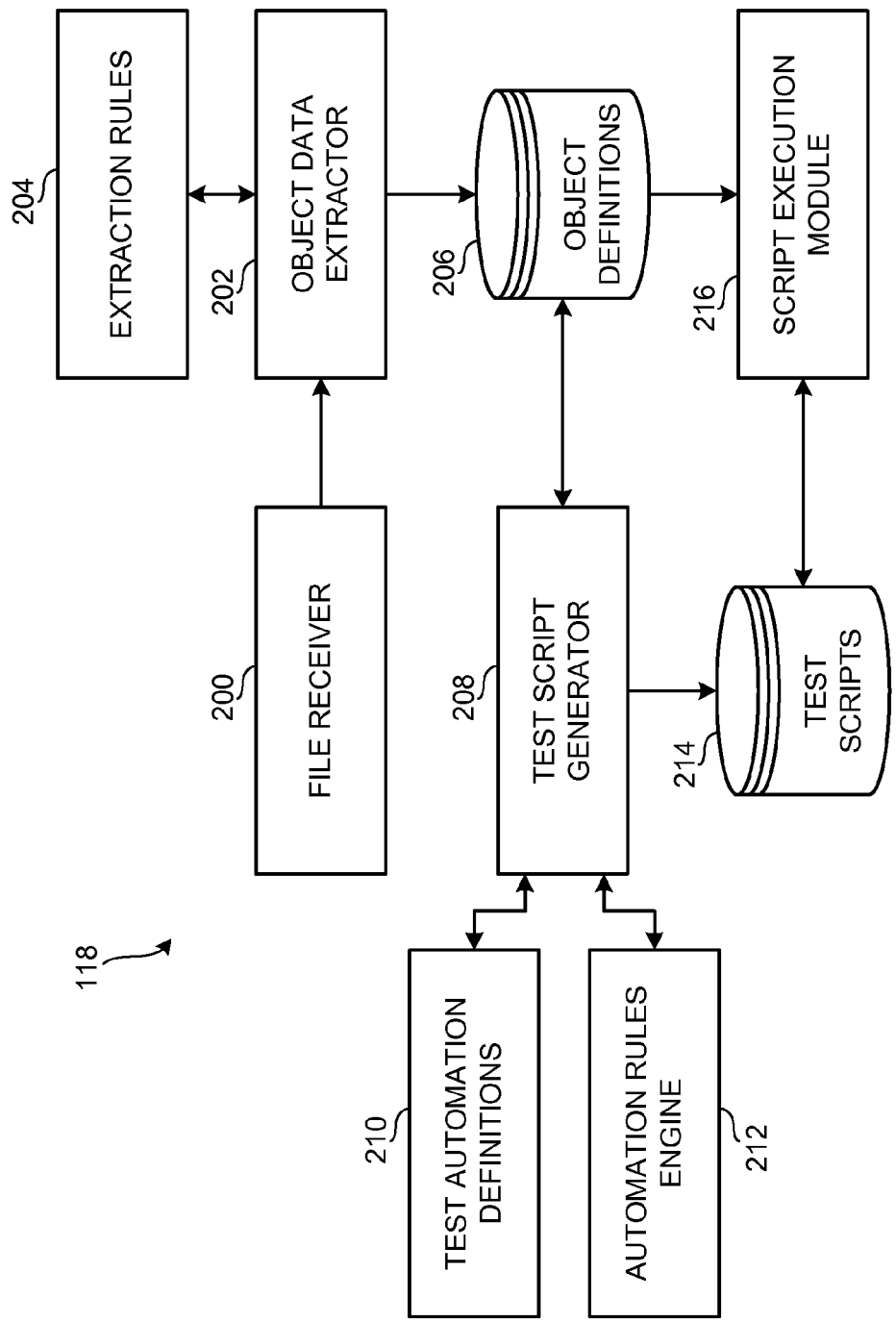
FIG. 2 is a block diagram of an example apparatus that may be used to implement the example testing module of FIG. 1.

FIG. 2 is a block diagram of an example apparatus that may be used to implement the example testing module 118 of FIG. 1. In the illustrated example of FIG. 2, the example testing module 118 includes a file receiver 200, an object data extractor 202, extraction rules 204, an object definition database 206, a test script generator 208, test automation definitions 210, an automation rules engine 212, a test script database 214, and a script execution module 216. While an example manner of implementing the testing module 118 of FIG. 1 has been illustrated in FIG. 2, one or more of the elements, processes and/or devices illustrated in FIG. 2 may be combined, divided, re-arranged, omitted, eliminated and/or implemented in any other way. Further, the example file receiver 200, the example object data extractor 202, the example extraction rules 204, the example object definition database 206, the example test script generator 208, the example test automation definitions 210, the example automation rules engine 212, the example test script database 214, the example script execution module 216, and/or, more generally, the testing module 118 of FIG. 2 may be implemented by hardware, software, firmware and/or any combination of hardware, software and/or firmware. Thus, for example, any of the example file receiver 200, the example object data extractor 202, the example extraction rules 204, the example object definition database 206, the example test script generator 208, the example test automation definitions 210, the example automation rules engine 212, the example test script database 214, the example script execution module 216, and/or, more generally, the testing module 118 of FIG. 2 can be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended claims are read to cover a purely software and/or firmware implementation, at least one of the example file receiver 200, the example object data extractor 202, the example extraction rules 204, the example object definition database 206, the example test script generator 208, the example test automation definitions 210, the example automation rules engine 212, the example test script database 214, the example script execution module 216, and/or, more generally, the testing module 118 of FIG. 2 are hereby expressly defined to include a tangible medium such as a memory, DVD, CD, etc., storing the software and/or firmware. Further still, the example testing module 118 of FIG. 2 may include one or more elements, processes and/or devices in addition to, or instead of, those illustrated in FIG. 2, and/or may include more than one of any or all of the illustrated elements, processes and devices.

The example file receiver 200 of FIG. 2 receives files associated with user interfaces to be tested such as, for example, the user interface(s) 110a of FIG. 1. As described above, designers and/or programmers build user interfaces using one or more applications, software tools, languages, etc. For purposes of illustration, the example of FIG. 2 is described in connection with a user interface based on, and generated using, XAML code. XAML is commonly used to generate user interfaces. Briefly, XAML simplifies creating a user interface for the .NET Framework programming model. Because XAML directly represents the instantiation of managed objects, designers and/or testers have simplified access to objects of the user interface. The example testing module 118 and the example methods, apparatus, systems, and/or articles of manufacture described herein can be used to test user interfaces based on, and/or generated using, any other suitable type of language, software tool, application, or file type such as, for example, Extensible Markup Language (XML), Hyper Text Markup Language (HTML), Visual Basic (VB), C, C#, JAVA, etc.

As described above, the user interface may be tested at any stage, including development, debugging, after deployment, etc. In the illustrated example, whenever a tester (e.g., an administrator, developer, and/or any other entity responsible for the proper functionality of the user interface) is to test a user interface, the tester loads the XAML code on which the user interface is based is into the example file receiver 200. The example file receiver 200 determines when the user interface is to be tested based on, for example, instructions received (e.g., from a user interface tester) with the XAML code. While the corresponding user interface is often tested immediately, in some instances, testing of the user interface is delayed. Furthermore, the example file receiver 200 may schedule periodic testing of any user interface stored therein and/or in another device to which the file receiver 200 has access. For example, during development of a user interface, the file receiver 200 may receive (or actively retrieve) a copy of the XAML code at a designated time (e.g., two o'clock in the morning) each day and initiate testing thereof Therefore, the user interface and the functionality of one or more aspects of the user interface in development (e.g., including changes or updates made to the user interface since the previous testing session) are automatically, continuously validated.

The file receiver 200 conveys the XAML code to the example object data extractor 202. In the illustrated example, the object data extractor 202 analyzes content of the XAML code and identifies objects corresponding to user interface elements. For example, the object data extractor 202 identifies the objects corresponding to buttons, check boxes, combo-boxes, lists, text boxes, etc. To assist in identifying the objects of the XAML code, the example object data extractor 202 references the example extraction rules 204. Generally, the example extraction rules 204 inform the example object data extractor 202 of how different objects are represented in the corresponding XAML code. The example extraction rules 204 in FIG. 2 include one or more data sheets that indicate what type of data or code represents different objects. Thus, to identify a first object of the XAML code as a button and a second object of the XAML code as a checkbox, the example object data extractor 202 references the example extraction rules 204 and the data sheet(s) thereof.

Like similar markup languages, user interface objects in XAML code have attributes or properties associated therewith. Example attributes include size, shape, position, visibility, label, etc. Programmers set the attributes of an object to configure the corresponding elements according to a design preference or requirements for a particular user interface. The example object data extractor 202 extracts the attributes of identified objects and stores the attributes in association with the corresponding objects as object definitions in the example object definition database 206. Thus, for a particular object of a particular user interface, the object definition database 206 of FIG. 2 includes a definition including information regarding the attributes of the particular object and the values of those attributes. For example, an object definition corresponding to a button may indicate that the button is six units wide, three units long, is positioned at a certain screen coordinate, is labeled "Click Here", and is visible to the user. As described below, such an object definition is used to test the functionality of the corresponding button and/or any aspects of the user interface tied to or associated with the button.

In the illustrated example, the object data extractor 202 extracts the object data and/or generates the object definitions at runtime. Thus, when the user interface being tested has undergone a change (e.g., during development of the user interface or as a result of a user-customizable feature of an existing user interface) the object definitions generated by the example object data extractor 202 correspond to updated XAML code. That is, unlike previous testing techniques, the example testing module 118 of FIG. 2 provides automatic updates to a testing session without relying on a visual representation of the user interface.

To generate one or more test scripts capable of testing the user interface corresponding to the XAML code being tested, the example test script generator 208 of FIG. 2 receives the object definitions associated with the user interface being tested from the object definition database 206. As described above, test scripts can be executed on the user interface code to validate the functionality of one or more aspects of the user interface. In the illustrated example, the test script generator 208 references the example test automation definitions 210 and the automation rules engine 212 to generate test script(s).

The example test automation definitions 210 of FIG. 2, which are configurable by user interface tester(s), define which aspects of different user interface objects are to be tested. In other words, the example test automation definitions 210 include instructions as to which attribute(s) of a first type of object are to be tested and which attribute(s) of a second type of object are to be tested. Thus, when the example test script generator 208 receives the first type of object from the object definition database 206, the test script generator 208 generates a script to test the attribute(s) listed in a corresponding entry of the test automation definitions 210.

For example, the test automation definitions 210 may include an entry for text boxes. The entry may include one or more attributes of text boxes that are to be tested if a user interface includes a text box. An example attribute of text boxes is a number range as an allowable input. The example entry of the test automation definitions 210 for text boxes may indicate that the number ranges of text boxes (if any) are to be tested. In such instances, the example test script generator 208 accesses the number range included in the corresponding object definition generated by the object data extractor 202 and uses the number range to generate a script to test the limits of the number range. For example, the test script may cause a number within the number range to be input into the text box and numbers outside the number range to be input into the text box. The functionality of the text box can then be verified by the results of the script inputted such numbers into the text box. Of course, the number range of a text box is an example attribute of an example type of object and other examples are possible.

The example test script generator 208 also uses information from the example automation rules engine 212 in generating the test scripts. The automation rules engine 212 includes one or more rules, which are configurable by the user interface tester(s), that define how the objects (e.g., as received from the object definition database 206) are to be tested by the resulting test scripts. In the illustrated example, the automation rules engine 212 defines one or more sequences in which the object of the corresponding user interface are to be tested.

For example, when the object definitions received from the object definition database 206 include a first number of buttons, a second number of check boxes, and a third number of text boxes, the automation rules engine 212 may instruct the test script generator 208 to test the buttons first, the check boxes second, and the text boxes third. Alternatively, the automation rules engine 212 may instruct the test script generator 208 to test a certain number of the buttons first, a certain number of the check boxes second, a certain number of the text boxes third, and the remainder of the objects in some other order. Further, when different types of objects are present in the user interface (e.g., as defined by the object definitions received from the object definition database 206), the sequencing of the automation rules may be different. That is, the presence of certain types of objects may influence the sequencing in which the objects are to be tested.

The example test script generator 208 references the automation rules engine 212 to determine an order in which the test scripts are to test the object(s) of the user interface. As described above, the example test script generator 208 also references the test automation definitions 210 to determine which attribute(s) or aspect(s) of different objects of the user interface are to be tested. In the illustrated example, using the information from the test automation definitions 210 and the automation rules engine 212, the test script generator 208 generates test script(s) to test the objects defined in the object definitions and stores the resulting test script(s) in the test script database 214. In some instances, the generated test scripts can be used as proof (e.g., to a regulatory entity) of the aspects of the corresponding user interface that was tested (e.g., during development of the user interface).

The example testing module 118 of FIG. 2 also includes the script execution module 216. The example script execution module 216 is capable of running the test scripts of, for example, the test script database 214 to validate the functionality and accuracy of the corresponding user interface(s). The results of these executions can also be used as proof (e.g., to a regulatory entity) that the user interface and the functionality thereof was tested (e.g., during development of the user interface).

Therefore, the example testing module 118 provides reduced cycle time in the development life cycle of a user interface by, for example, automating a user interface testing session. Further, customizable user interfaces (e.g., by a customer such as the hospital 102) can be automatically tested without, for example, having to generate a script based on a visual representation of the customizable user interface.

Figure 3:
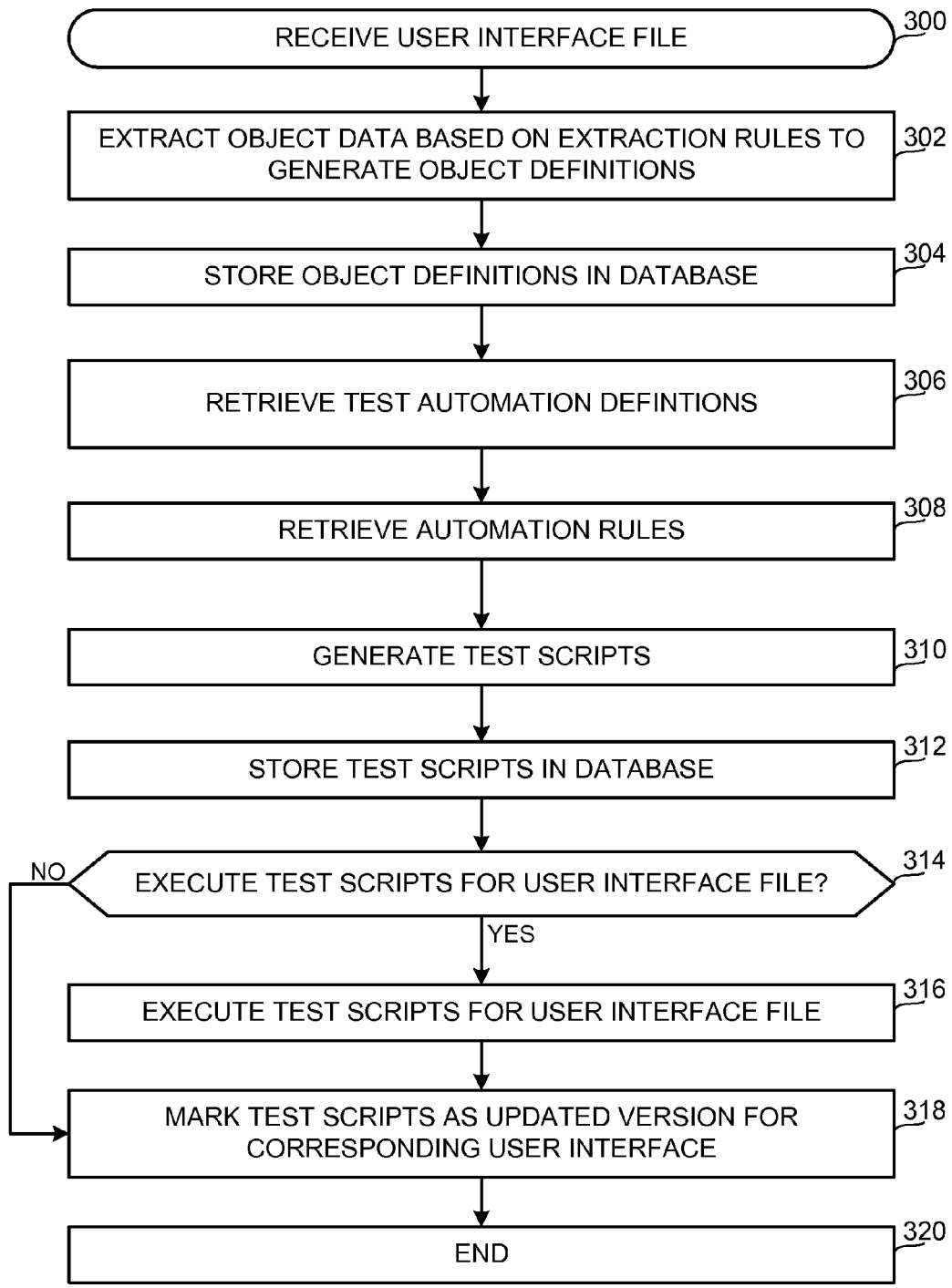
FIG. 3 is a flow diagram representative of example machine readable instructions that may be executed to implement the example testing module of FIGS. 1 and/or 2.

Turning to FIG. 3, the flow diagram depicted in FIG. 3 is representative of machine readable instructions that can be executed to implement the example testing module 118 of FIGS. 1 and/or 2 to test one or more user interfaces (e.g., the user interface(s) 110a-c of FIG. 1 and/or any other type of user interface). The example processes of FIG. 3 may be performed using a processor, a controller and/or any other suitable processing device. For example, the example processes of FIG. 3 may be implemented in coded instructions stored on a tangible medium such as a flash memory, a read-only memory (ROM) and/or random-access memory (RAM) associated with a processor (e.g., the example processor 412 discussed below in connection with FIG. 4). Alternatively, some or all of the example processes of FIG. 3 may be implemented using any combination(s) of application specific integrated circuit(s) (ASIC(s)), programmable logic device(s) (PLD(s)), field programmable logic device(s) (FPLD(s)), discrete logic, hardware, firmware, etc. Also, some or all of the example processes of FIG. 3 may be implemented manually or as any combination(s) of any of the foregoing techniques, for example, any combination of firmware, software, discrete logic and/or hardware. Further, although the example processes of FIG. 3 are described with reference to the flow diagram of FIG. 3, other methods of implementing the processes of FIG. 3 may be employed. For example, the order of execution of the blocks may be changed, and/or some of the blocks described may be changed, eliminated, sub-divided, or combined. Additionally, any or all of the example processes of FIG. 3 may be performed sequentially and/or in parallel by, for example, separate processing threads, processors, devices, discrete logic, circuits, etc.

When a user interface tester (e.g., a programmer or developer) is scheduled to and/or desires to test a user interface, the example file receiver 200 (FIG. 2) receives a file on which the user interface is based (block 300). Additionally or alternatively, the file receiver 200 may receive or actively retrieve one or more user interface files according to a schedule defined in, for example, the file receiver 200 or a testing application having access to the file receiver 200. As described above, the file may be of any type (e.g., XAML, XML, HTML, VB, C, C#, JAVA, etc.). When, for example, the file receiver 200 determines that the user interface corresponding to the receive code is to be tested, the file receiver 200 conveys the code to the example object data extractor 202 (FIG. 2). The object data extractor 202 analyzes content of the code and identifies objects corresponding to user interface elements (e.g., buttons, check boxes, combo-boxes, lists, text boxes, etc). In particular, the object data extractor 202 references the extraction rules 204 (FIG. 2) to determine what type of data or code represents different types of objects.

The object data extractor 202 analyzes the attributes of the identified objects and extracts the same to generate object definitions (block 302). The resulting object definitions, which include information regarding the attributes of the identified objects, are stored in the object definition database 206 (FIG. 2) (block 304).

The test script generator 208 (FIG. 2) receives the object definitions associated with the user interface being tested from the object definition database 206. To generate test scripts for the user interface, the test script generator 208 retrieves test automation definitions 210 (FIG. 2) (block 306). As described above in detail, the test automation definitions 210 define which aspects of different user interface objects (e.g., a number range (if any) of text box) are to be tested in, for example, this particular instance of testing.

To generate test scripts for the user interface, the test script generator 208 also retrieves automation rules from the automation rules engine 212 (FIG. 2) (block 308). As described above in detail, the automation rules of the automation rules engine 212 define how the objects are to be tested by the test scripts. For example, the automation rules engine 212 defines one or more sequences in which the object of the corresponding user interface are to be tested in, for example, this particular instance of testing.

Using the information from the test automation definitions 210 and the automation rules engine 212, the test script generator 208 generates test script(s) to test the objects defined in the object definitions received from the object definition database 206 (block 310). In the illustrated example, the test script generator conveys the test scripts to the test script database 214 (FIG. 2) (block 312).

As described above, the test scripts of the test script database 214 can be executed by the script execution module 216 (FIG. 2). The example script execution module 216 is capable of running the test scripts to validate the functionality and accuracy of the corresponding user interface(s). In the illustrated example, the script execution module 216 runs according to a schedule and/or in response to commands from a user (e.g., a user interface tester or designer). When one or more of the test scripts of the test script database 214 are to be tested (block 314), the script execution module 216 retrieves one or more corresponding test scripts and executes the same on the user interface to be tested (block 316). Further, upon receiving test scripts from the test script generator 208, the test script database 214, the test script generator 208, and/or any other suitable component or device marks the generated test script(s) as the updated version(s) for the corresponding user interface (block 318). That is, the test script database 214 includes an indication (e.g., a marker and/or a timestamp) of the most recent version of the test script(s) for a user interface and/or a component thereof. The example of FIG. 3 then ends (block 320).

Figure 4:
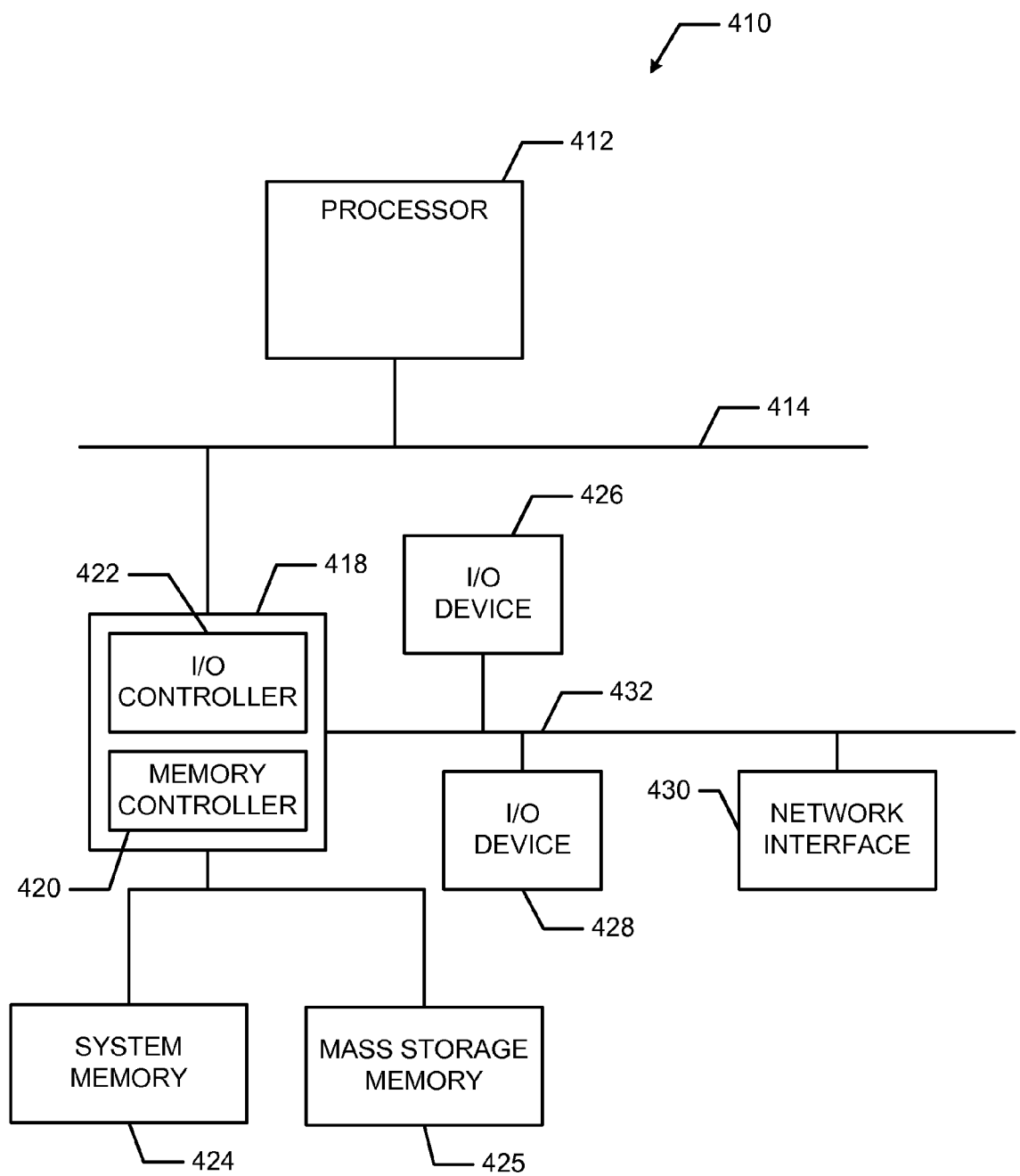
FIG. 4 is a block diagram of an example processor system that may be used to execute the machine readable instructions of FIG. 3 to implement the example testing module of FIGS. 1 and/or 2.

FIG. 4 is a block diagram of an example processor system 410 that may be used to implement the apparatus and methods described herein. As shown in FIG. 4, the processor system 410 includes a processor 412 that is coupled to an interconnection bus 414. The processor 412 may be any suitable processor, processing unit or microprocessor. Although not shown in FIG. 4, the system 410 may be a multi-processor system and, thus, may include one or more additional processors that are identical or similar to the processor 412 and that are communicatively coupled to the interconnection bus 414.

The processor 412 of FIG. 4 is coupled to a chipset 418, which includes a memory controller 420 and an input/output (I/O) controller 422. As is well known, a chipset typically provides I/O and memory management functions as well as a plurality of general purpose and/or special purpose registers, timers, etc. that are accessible or used by one or more processors coupled to the chipset 418. The memory controller 420 performs functions that enable the processor 412 (or processors if there are multiple processors) to access a system memory 424 and a mass storage memory 425.

The system memory 424 may include any desired type of volatile and/or non-volatile memory such as, for example, static random access memory (SRAM), dynamic random access memory (DRAM), flash memory, read-only memory (ROM), etc. The mass storage memory 425 may include any desired type of mass storage device including hard disk drives, optical drives, tape storage devices, etc.

The I/O controller 422 performs functions that enable the processor 412 to communicate with peripheral input/output (I/O) devices 426 and 428 and a network interface 430 via an I/O bus 432. The I/O devices 426 and 428 may be any desired type of I/O device such as, for example, a keyboard, a video display or monitor, a mouse, etc. The network interface 430 may be, for example, an Ethernet device, an asynchronous transfer mode (ATM) device, an 802.11 device, a DSL modem, a cable modem, a cellular modem, etc. that enables the processor system 410 to communicate with another processor system.

While the memory controller 420 and the I/O controller 422 are depicted in FIG. 4 as separate blocks within the chipset 418, the functions performed by these blocks may be integrated within a single semiconductor circuit or may be implemented using two or more separate integrated circuits.

Certain embodiments contemplate methods, systems and computer program products on any machine-readable media to implement functionality described above. Certain embodiments may be implemented using an existing computer processor, or by a special purpose computer processor incorporated for this or another purpose or by a hardwired and/or firmware system, for example.

Certain embodiments include computer-readable media for carrying or having computer-executable instructions or data structures stored thereon. Such computer-readable media may be any available media that may be accessed by a general purpose or special purpose computer or other machine with a processor. By way of example, such computer-readable media may comprise RAM, ROM, PROM, EPROM, EEPROM, Flash, CD-ROM or other optical disk storage, magnetic disk storage or other magnetic storage devices, or any other medium which can be used to carry or store desired program code in the form of computer-executable instructions or data structures and which can be accessed by a general purpose or special purpose computer or other machine with a processor. Combinations of the above are also included within the scope of computer-readable media. Computer-executable instructions comprise, for example, instructions and data which cause a general purpose computer, special purpose computer, or special purpose processing machines to perform a certain function or group of functions.

Generally, computer-executable instructions include routines, programs, objects, components, data structures, etc., that perform particular tasks or implement particular abstract data types. Computer-executable instructions, associated data structures, and program modules represent examples of program code for executing steps of certain methods and systems disclosed herein. The particular sequence of such executable instructions or associated data structures represent examples of corresponding acts for implementing the functions described in such steps.

Embodiments of the present invention may be practiced in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet and may use a wide variety of different communication protocols. Those skilled in the art will appreciate that such network computing environments will typically encompass many types of computer system configurations, including personal computers, hand-held devices, multi-processor systems, microprocessor-based or programmable consumer electronics, network PCs, minicomputers, mainframe computers, and the like. Embodiments of the invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

Although certain methods, apparatus, and articles of manufacture have been described herein, the scope of coverage of this patent is not limited thereto. To the contrary, this patent covers all methods, apparatus, and articles of manufacture fairly falling within the scope of the appended claims either literally or under the doctrine of equivalents.

What is claimed is:

1. A computer implemented method for testing a user interface, comprising:
    extracting object data associated with user interface elements from a file associated with the user interface;
    storing an object definition for respective ones of the user interface elements in memory;
    referencing an automation rule with the object definition to obtain a testing sequence for the user interface elements, wherein the testing sequence obtained from the automation rule is based on a type of respective ones of the user interface elements, wherein extracting the object data from the file associated with the user interface comprises referencing a set of extraction rules configured to identify the types of the user interface elements;
    referencing a test definition with the object definition to obtain one or more attributes of the user interface elements to be tested, wherein the object data associated with the user interface elements includes the attributes of the corresponding user interface elements; and
    generating, via a processor, a test script for the user interface using the one or more attributes of the user interface elements and the testing sequence.

2. The computer implemented method as defined in claim 1, wherein at least one of the test definition or the automation rule is configurable by a user.

3. The computer implemented method as defined in claim 1, further comprising executing the test script to test the user interface.

4. The computer implemented method as defined in claim 1, wherein extracting object data from the file associated with the user interface is to be performed at runtime of a testing session.

5. The computer implemented method as defined in claim 1, wherein the testing sequence defined by the automation rule includes the user interface elements of a first type being tested before the user interface elements of a second type when the user interface includes a third type of user interface element, and wherein the testing sequence defined by the automation rule includes the user interface elements of the first type being tested after the user interface elements of the second type when the user interface does not include the third type of user interface element.

6. A tangible machine readable memory having instructions stored thereon that, when executed, cause a machine to at least:
    extract object data associated with user interface elements from a file associated with a user interface;
    store an object definition for respective ones of the user interface elements in the machine readable memory;
    reference an automation rule with the object definition to obtain a testing sequence for the user interface elements, wherein the testing sequence obtained from the automation rule depends on which types of user interface elements are present in the user interface, wherein extracting the object data from the file associated with the user interface comprises referencing a set of extraction rules configured to identify the types of the user interface elements;
    reference a test definition with the object definition to obtain one or more attributes of the user interface elements to be tested, wherein the object data associated with the user interface elements includes the attributes of the corresponding user interface elements; and
    generate a test script for the user interface using the one or more attributes of the user interface elements and the testing sequence.

7. The memory as defined in claim 6, wherein at least one of the test definition or the automation rule is configurable by a user.

8. The memory as defined in claim 6 having instructions stored thereon that, when executed, cause a machine to execute the test script to test the user interface.

9. The memory as defined in claim 6 having instructions stored thereon that, when executed, cause a machine to extract the object data at runtime of a testing session.

10. The memory as defined in claim 6, wherein the testing sequence defined by the automation rule includes the user interface elements of a first type being tested before the user interface elements of a second type when the user interface includes a third type of user interface element, and wherein the testing sequence defined by the automation rule includes the user interface elements of the first type being tested after the user interface elements of the second type when the user interface does not include the third type of user interface element.

11. An apparatus for testing a user interface, comprising:
    an object data extractor to extract object data associated with user interface elements from a file associated with the user interface and to generate a plurality of object definitions for the user interface elements from the extracted object data;
    memory to store the plurality of object definitions; and
    a test script generator to generate a test script for the user interface using the object definitions, wherein the test script is to be generated based on one or more test definitions defining one or more attributes of the user interface elements to be tested via the test script, wherein the test script is to be generated based on one or more automation rules that define a testing sequence in which the user interface elements of the user interface are to be tested, wherein the one or more automation rules indicate that a first type of user interface element is to be tested before a second type of user interface element, wherein the object data extractor is to extract the object data from the file associated with the user interface by referencing a set of extraction rules configured to identify the types of the user interface elements, and wherein the object data associated with the user interface elements includes the attributes of the corresponding user interface elements.

12. The apparatus as defined in claim 11, wherein at least one of the one or more test definitions or the one or more automation rules are configurable by a user.

13. The apparatus as defined in claim 11, wherein the object data extractor is to extract the object data at runtime of a testing session.

14. A computer implemented method for testing a user interface, comprising:
    extracting object data associated with user interface elements from a file associated with the user interface;
    storing an object definition for respective ones of the user interface elements in memory;
    referencing an automation rule with the object definition to obtain a testing sequence for the user interface elements, wherein the testing sequence obtained from the automation rule is based on a type of respective ones of the user interface elements, wherein the testing sequence defined by the automation rule includes the user interface elements of a first type being tested before the user interface elements of a second type when the user interface includes a third type of user interface element, and wherein the testing sequence defined by the automation rule includes the user interface elements of the first type being tested after the user interface elements of the second type when the user interface does not include the third type of user interface element;

referencing a test definition with the object definition to obtain one or more attributes of the user interface elements to be tested; and generating, via a processor, a test script for the user interface using the one or more attributes of the user interface elements and the testing sequence.

15. A tangible machine readable memory having instructions stored thereon that, when executed, cause a machine to at least:

extract object data associated with user interface elements from a file associated with a user interface;

store an object definition for respective ones of the user interface elements in the machine readable memory;

reference an automation rule with the object definition to obtain a testing sequence for the user interface elements, wherein the testing sequence obtained from the automation rule depends on which types of user interface elements are present in the user interface, wherein the testing sequence defined by the automation rule includes the user interface elements of a first type being tested before the user interface elements of a second type when the user interface includes a third type of user interface element, and wherein the testing sequence defined by the automation rule includes the user interface elements of the first type being tested after the user interface elements of the second type when the user interface does not include the third type of user interface element;

reference a test definition with the object definition to obtain one or more attributes of the user interface elements to be tested; and generate a test script for the user interface using the one or more attributes of the user interface elements and the testing sequence.

16. An apparatus for testing a user interface, comprising:

an object data extractor to extract object data associated with user interface elements from a file associated with the user interface and to generate a plurality of object definitions for the user interface elements from the extracted object data;

memory to store the plurality of object definitions; and a test script generator to generate a test script for the user interface using the object definitions, wherein the test script is to be generated based on one or more test definitions defining one or more attributes of the user interface elements to be tested via the test script, wherein the test script is to be generated based on one or more automation rules that define a testing sequence in which the user interface elements of the user interface are to be tested, wherein the one or more automation rules indicate that a first type of user interface element is to be tested before a second type of user interface element when the user interface includes a third type of user interface element, and wherein the one or more automation rules indicate that the first type of user interface element is to tested after the second type of user interface element when the user interface does not include the third type of user interface element.

* * * * *

UNITED STATES PATENT AND TRADEMARK OFFICE
CERTIFICATE OF CORRECTION

| | | |
|---|---|---|
| PATENT NO. | : 8,627,295 B2 | Page 1 of 1 |
| APPLICATION NO. | : 12/576858 | |
| DATED | : January 7, 2014 | |
| INVENTOR(S) | : Harold Brooks Foley et al. | |

It is certified that error appears in the above-identified patent and that said Letters Patent is hereby corrected as shown below:

In the Claims:

Column 16, line 31: "element is to tested" should read --element is to be tested--.

Signed and Sealed this
Thirteenth Day of May, 2014

Michelle K. Lee
*Deputy Director of the United States Patent and Trademark Office*